US011769087B2

(12) United States Patent
Somashekairah et al.

(10) Patent No.: US 11,769,087 B2
(45) Date of Patent: Sep. 26, 2023

(54) MULTILABEL LEARNING WITH LABEL RELATIONSHIPS

(71) Applicant: Microsoft Technology Licensing, LLC, Redmond, WA (US)

(72) Inventors: Girish Kathalagiri Somashekairah, Santa Clara, CA (US); Varun Mithal, Sunnyvale, CA (US); Aman Grover, San Carlos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 16/892,846

(22) Filed: Jun. 4, 2020

(65) Prior Publication Data

US 2021/0383306 A1    Dec. 9, 2021

(51) Int. Cl.
   *G06Q 10/0631*    (2023.01)
(52) U.S. Cl.
   CPC .............................. *G06Q 10/063112* (2013.01)
(58) Field of Classification Search
   None
   See application file for complete search history.

(56) References Cited

U.S. PATENT DOCUMENTS

| | | | | |
|---|---|---|---|---|
| 11,263,563 B1 * | 3/2022 | Moghaddam | ...... | G06Q 10/1053 |
| 11,282,147 B2 * | 3/2022 | Mossoba | ............ | G06F 21/6218 |
| 2013/0268373 A1 * | 10/2013 | Grishaver | .............. | G06Q 30/02 |
| | | | | 705/14.67 |
| 2016/0034853 A1 * | 2/2016 | Wang | ................ | G06F 16/24578 |
| | | | | 705/321 |
| 2018/0150784 A1 * | 5/2018 | Wang | ..................... | G06Q 50/01 |
| 2018/0336241 A1 * | 11/2018 | Noh | ....................... | G06F 16/242 |
| 2019/0034882 A1 * | 1/2019 | Saha | ...................... | G06N 20/00 |
| 2020/0226532 A1 * | 7/2020 | Lazarus | ......... | G06Q 10/063112 |
| 2020/0273013 A1 * | 8/2020 | Garner | ................. | G06Q 10/087 |
| 2020/0380407 A1 * | 12/2020 | Jiang | ..................... | G06N 7/005 |
| 2021/0073737 A1 * | 3/2021 | Flynn | ..................... | G06N 20/00 |

(Continued)

OTHER PUBLICATIONS

"Łukasiewicz Logic", Retrieved From: https://en.wikipedia.org/wiki/%C5%81ukasiewicz_logic, Retrieved on: Jun. 4, 2020, 4 Pages.

(Continued)

*Primary Examiner* — Folashade Anderson
(74) *Attorney, Agent, or Firm* — Schwegman, Lundberg & Woessner, P.A.

(57) ABSTRACT

Machine learning based method for multilabel learning with label relationships is provided. This methodology addresses the technical problem of alleviating computational complexity of training a machine learning model that generates multilabel output with constraints, especially in contexts characterized by a large volume of data, by providing a new formulation that encodes probabilistic relationships among the labels as a regularization parameter in the training objective of the underlying model. For example, the training process of the model may be configured to have two objectives. Namely, in addition to the objective of minimizing conventional multilabel loss, there is another training objective, which is to minimize penalty associated with the prediction generated by the model breaking probabilistic relationships among the labels.

18 Claims, 4 Drawing Sheets

(56) References Cited

U.S. PATENT DOCUMENTS

2021/0103876 A1* 4/2021 Petrosso ............... G06F 18/24
2022/0172147 A1* 6/2022 Jose ............... G06Q 10/06393

OTHER PUBLICATIONS

Bishop, Christopher M., "Pattern Recognition and Machine Learning", In Publication of Springer, 2006, 758 Pages.

Deng, et al., "Large-Scale Object Classification Using Label Relation Graphs", In Proceedings of European Conference on Computer Vision, Sep. 6, 2014, pp. 1-17.

Ding, et al., "Probabilistic Label Relation Graphs with Ising Models", In Repository of arXiv:1503.01428v3, Dec. 22, 2015, 9 pages.

Kimmig, et al., "A Short introduction to Probabilistic Soft Logic", In Proceedings of the NIPS Workshop on Probabilistic Programming: Foundations and Applications, Dec. 7, 2012, pp. 1-4.

* cited by examiner

MULTILABEL LEARNING WITH LABEL RELATIONSHIPS

TECHNICAL FIELD

This application relates to the technical fields of software and/or hardware technology and, in one example embodiment, to multilabel learning with label relationships.

BACKGROUND

An online connection network system is a web-based platform (e.g., a connection networking web site) that may be accessed by a user via a web browser or via a mobile application provided on a mobile phone, a tablet, etc. It may be a business-focused connection network designed specifically for the business community, where registered members establish and document networks of people they know and trust professionally. Each registered member may be represented by a member profile, which, in turn, may be represented by one or more web pages or a structured representation of the member's information in XML (Extensible Markup Language), JSON (JavaScript Object Notation) or similar format. A member's profile web page may include various information in the form of typed entities, such as, e.g., the name of a member, current and previous geographic location of a member, current and previous employment information of a member, as well as information about the member's professional skills. An online connection network system may permit members to search for various types of information available within the system, such as member profiles and job postings, and may also be configured to generate or obtain various relevant content for presentation to a member. Such content, e.g., job postings describing jobs that may be of interest to the member, may be selected based on generated probabilities of the member engaging with respective content items, and may be presented on a news feed web page generated for the member at the time the member initiates a session with the online connection network system.

BRIEF DESCRIPTION OF DRAWINGS

Embodiments of the present invention are illustrated by way of example and not limitation in the figures of the accompanying drawings, in which like reference numbers indicate similar elements and in which.

OVERVIEW

Figure 1:
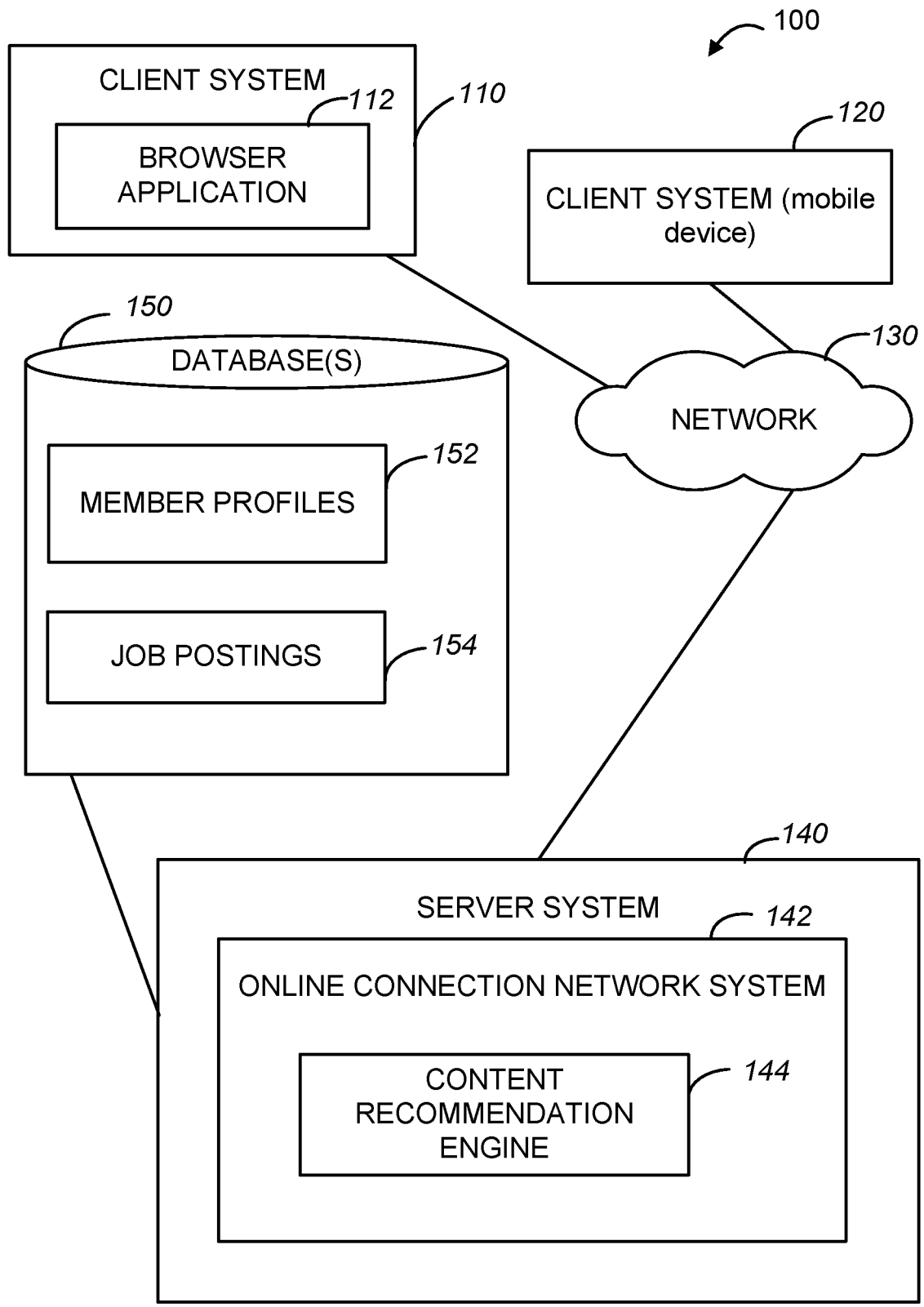
FIG. 1 is a diagrammatic representation of a network environment within which an example machine learning based method for multilabel learning with label relationships may be implemented.

In the space of job recommendations in online connection networks, which is chosen to illustrate example use of the inventive methodology, a machine learning model may be constructed to predict respective probabilities of a user viewing a job posting, applying for the job described in the job posting, saving the job posting and dismissing the job posting. The action of dismissing a job posting, in some embodiments, precludes a further action by a user with respect to a reference to the job posting displayed on a display device of the user. This machine learning model may be referred to as a prediction model. The labels (view, apply, save and dismiss, representing outcomes with respect to input to the prediction model comprising two feature vectors, one representing a user and another representing a job posting) have certain hierarchy of relationships among them. For example, if a user applied for a job, it is not possible that the user did not first view the associated job posting; or if a user applied for a job, it must also be true that the associated job posting has not been dismissed by the user.

One approach to learning a model that predicts multiple outcomes (labels) is to model soft or probabilistic relationships among labels as an Ising model where label relationships are modeled as potentials, and using a standard Loopy Belief Propagation (LBP) algorithm for inference and training the model. The LBP algorithm involves iterating between: (i) training of underlying Deep Neural Networks (DNNs) that is used for converting the input to prediction and (ii) message passing along the Ising model nodes that help enforce the label relationships. Since training DNNs requires working with large volumes of data and is usually computationally demanding, an additional iteration involving retaining DNNs with each message passing becomes computationally challenging.

The technical problem of alleviating computational complexity of multilabel machine learning with label relationships, especially in systems characterized by large volumes of data such as online connection networks, is addressed by providing a new formulation that encodes soft relationships among labels as a regularization parameter (regularizer) in the training objective of the underlying machine learning model. The underlying machine learning model may be any suitable machine learning model, such as, e.g., DNNs.

In one embodiment, the training process of the prediction model is configured to have multiple objectives. In addition to the objective of minimizing conventional multilabel loss (in the instant example, loss associated with incorrectly predicting the view, apply and save outcomes), there is another training objective, which is minimizing the penalty term associated with breaking the hierarchy of relationship among the labels. For example, with respect to the dismiss, view, apply and save labels, the penalty term is designed to be greater than zero if (1) the probability of apply or save is predicted to be greater than the probability of view and (2) if the probability of save or apply is greater than zero while the probability of dismiss is also predicted to be greater than zero.

A machine learning paradigm that leverages hierarchy of relationships among the predicted outcome probabilities may be used beneficially to help achieve a number of advantages. It is likely to generate predictions that obey the relationships (whereas independent binary classifiers, each dedicated to predict a single outcome, may lead to predictions that contradict existing relationship among the outcomes). It is likely to improve generalization of the prediction model by reduction in the version space, and thus achieve better performance even in small training sample scenarios. In the use case of job recommendations in online connection networks the prediction model is provided with a content recommendation engine configured to select job postings for presentation to a member, e.g., on the member's news feed web page. Job postings in the online connection network system are represented by feature vectors. The features in the feature vectors may represent, e.g., a job industry, a professional field, a job title, a company name, professional seniority, geographic location, skills, etc.

DETAILED DESCRIPTION

A machine learning based methodology for multilabel learning with label relationships in online connection networks is described. In the following description, for purposes of explanation, numerous specific details are set forth in order to provide a thorough understanding of an embodiment of the present invention. It will be evident, however, to one skilled in the art that the present invention may be practiced without these specific details.

As explained above, a recommendation engine provided with an online connection network utilizes a prediction model that predicts multiple response variables or outcomes (whether a job posting will be viewed, saved, applied, or dismissed) that can then be used to select job postings for presentation to a member. These outcomes have a certain hierarchy of relationship. For example, if a member applied for a job, it must also be true that the associated job posting has also been viewed by that member (subset relation). If a member applied for a job, it must also be true that the associated job posting has not been dismissed by the member (exclusion relation). Also, it is possible that a member applied for a job and also saved the associated job posting (overlap relation). Predicted outcomes generated by the prediction model are represented by respective labels—view, apply, save and dismiss. The hierarchical and exclusion (HEX) relationships among the labels are illustrated in Table 1 and Table 2 below. Table 1 illustrates hierarchical relationships among the labels. Table 2 illustrates exclusion relationships among the labels. In Table 1 and Table 2 the valid configurations are identified in the last column as "True" and the invalid configurations are identified in the last column as "False."

TABLE 1

| VIEW | APPLY | SAVE | VALID |
|---|---|---|---|
| 1 | 1 | 1 | TRUE |
| 1 | 1 | 0 | TRUE |
| 1 | 0 | 1 | TRUE |
| 1 | 0 | 0 | TRUE |
| 0 | 1 | 1 | FALSE |
| 0 | 1 | 0 | FALSE |
| 0 | 0 | 1 | FALSE |
| 0 | 0 | 0 | TRUE |

The values in the first three columns in Table 1 indicate respective probabilities that could be generated by the prediction model with respect to the view, apply and save labels. For example, a configuration where the probability of view is 1 and the probabilities of apply and save are zero is a valid configuration, while the prediction of a view probability being zero and the probability of apply or save being 1 is not valid.

TABLE 2

| DISMISS | APPLY | SAVE | VALID |
|---|---|---|---|
| 1 | 1 | 1 | FALSE |
| 1 | 1 | 0 | FALSE |
| 1 | 0 | 1 | FALSE |
| 1 | 0 | 0 | TRUE |
| 0 | 1 | 1 | TRUE |
| 0 | 1 | 0 | TRUE |
| 0 | 0 | 1 | TRUE |
| 0 | 0 | 0 | TRUE |

The values in the first three columns in Table 2 indicate respective probabilities that could be generated by the prediction model with respect to the dismiss, apply and save labels. For example, configurations where the probability of dismiss is zero and the probabilities of apply or save are 1 are invalid, while the prediction of a dismiss probability being zero and the probability of apply or save being 1 is valid. It will be noted that, while the inventive methodology is described using example labels and their relationships listed above, this methodology may be practiced beneficially to make predictions with respect to any set of multiple possible outcomes having HEX relationships among them.

The training objectives of minimizing loss and also minimizing penalty for violating hierarchical relationships among the view, apply, and save outcomes, specified in Table 1, are shown in Expression 1 and Expression 2 below. The loss, which is to be minimized as one of the training objectives in training the prediction model—the loss associated with incorrect prediction of view, apply, and save outcomes—is shown as Expression 1 below. The penalty, which is to be minimized as another training objectives in training the prediction model—penalty for predictions that violate hierarchical relationships among the view, apply, and save outcomes specified in Table 1—is shown as Expression 2 below.

$$L(f_{(xi)}^{view}, y_i^{view}) + L(f_{(xi)}^{apply}, y_i^{apply}) + L(f_{(xi)}^{save}, y_i^{save}), \quad \text{Expression 1}$$

where L is a loss function, f is the prediction function that is being learned, $x_i$ is input in the form of features representing an $i^{th}$ profile and features representing an $i^{th}$ job posting, and $y_i$ is binary prediction generated by the prediction function for the $x_i$ input, indicating positive or zero probability of the outcome associated with the respective label.

$$\lambda_1 * \max(0, f_{(xi)}^{apply} - f_{(xi)}^{view}) \pm \lambda_2 * \max(0, f_{(xi)}^{save} - f_{(xi)}^{view}), \quad \text{Expression 2}$$

where f is the prediction function that is being learned, $x_i$ is input in the form of features representing an $i^{th}$ profile and features representing an $i^{th}$ job posting, the and $y_i$ is binary prediction generated by the prediction function for the $x_i$ input, indicating positive or zero probability of the outcome associated with the respective label, and $\lambda$ is a penalty factor that indicates how much to penalize violations of different hierarchical relationships (here, between view and apply, and view and save) relative to each other and relative to the loss calculated using Expression 1.

As is shown in Expression 2, there is no penalty for violation of the hierarchical relationship between view and apply if the prediction function output indicates probability of apply greater than probability of view, and there is no penalty for violation of the hierarchical relationship between view and save if the prediction function output indicates the probability of save greater than probability of view. Conversely, there is a penalty for violation of the hierarchical relationship between view and apply if the prediction function output indicates probability of view is greater than the probability of apply, and there is no penalty for violation of the hierarchical relationship between view and save if the prediction function output indicates the probability of view is greater than the probability of save.

Turning now to the exclusion relationships among the dismiss, apply and save labels listed in Table 2, the training objectives of minimizing loss and also minimizing penalty for violating exclusion relationships among the dismiss, apply, and save outcomes are shown in Expression 3 and Expression 4 below.

The loss associated with incorrect prediction of dismiss, apply, and save outcomes is shown as Expression 3 below. The penalty for predictions that violate exclusion relationships among the dismiss, apply, and save outcomes specified in Table 2 is shown as Expression 3 below.

$$L(f_{(xi)}^{dismiss}, y_i^{dismiss}) + L(f_{(xi)}^{apply}, y_i^{apply}) + L(f_{(xi)}^{save}, y_i^{save}) \qquad \text{Expression 3}$$

where L is a loss function, f is the prediction function that is being learned, $x_i$ is input in the form of features representing an $i^{th}$ profile and features representing an $i^{th}$ job posting, and $y_i$ is binary prediction generated by the prediction function for the $x_i$ input, indicating positive or zero probability of the outcome associated with the respective label.

$$\lambda_1 * \max(0, f_{(xi)}^{apply} + f_{(xi)}^{dismiss} - 1) + \lambda_2 * \max(0, f_{(xi)}^{save} + f_{(xi)}^{dismiss} - 1), \qquad \text{Expression 4}$$

where f is the prediction function that is being learned, $x_i$ is input in the form of features representing an $i^{th}$ profile and features representing an $i^{th}$ job posting, the and $y_i$ is binary prediction generated by the prediction function for the $x_i$ input, indicating positive or zero probability of the outcome associated with the respective label, and $\lambda$ is a penalty factor that indicates how much to penalize violations of different exclusion relationships (here, between dismiss and apply, and dismiss and save) relative to each other and relative to the loss calculated using Expression 3.

The machine learning methodology described herein may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an online connection network system 142. As explained above, each member of an online connection network is represented by a member profile that contains personal and professional information about the member and that may be associated with connection links that indicate the member's connection to other member profiles in the online connection network. Member profiles and related information may be stored in a database 150 as member profiles 152. The database 150 also stores other entities, such as job postings 154.

The client systems 110 and 120 can access the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a content recommendations engine 144. The content recommendations engine 144 is configured to perform the machine learning based method for multilabel learning with label relationships in online connection networks, by applying methodologies discussed herein.

Figure 2:
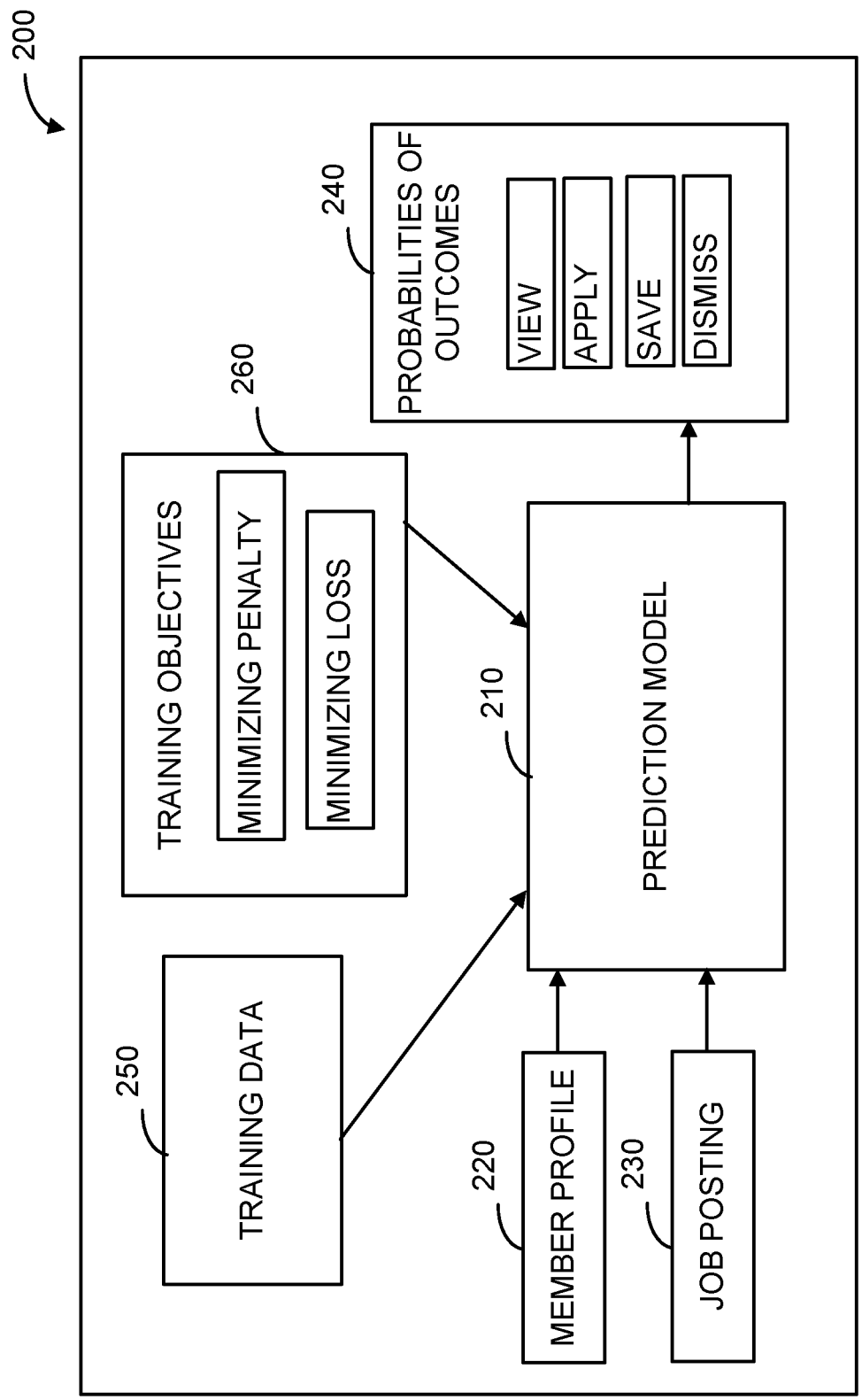
FIG. 2 is a block diagram of an architecture for multilabel learning with label relationships, in accordance with one example embodiment.

FIG. 2 is a block diagram of an architecture 200 used by the content recommendations engine 144 of FIG. 1. Shown in FIG. 2 is a prediction model 210 constructed to take, as input, member profile information 220 and job posting information 230, and generate a multilabel prediction 240. The prediction model may be, e.g., DNNs that takes, as input, member profiles and job posting in the form of n-dimensional real value vectors. In one embodiment, the multilabel prediction is in the form of probabilities generated for view, apply, save, and dismiss actions initiated by a user represented by the member profile with respect to the job posting (e.g., with respect to a hyperlink to the job posting presented on the user's display device). The prediction model 210 is trained using training data 250 and training objectives 260. The training data 250 is generated using tracking information. The online connection network system 142 of FIG. 1 events such as member clicking a job posting, applying for a job represented by a job posting, dismissing a job posting, etc. The data representing the tracked events is stored in a database. A module configured to generated training data reads the data representing the tracked events from this database to generate the training data 250.

The training objectives 260 include an objective of minimizing loss associated with incorrect predictions and an objective of minimizing the penalty term associated with breaking defined relationships among the labels. As explained above, the defined relationships among the labels may be hierarchical (e.g., if a user applied for a job, it must also be true that the associated job posting has also been viewed by that user) or exclusion (e.g., if a member applied for a job, it must also be true that the associated job posting has not been dismissed by the member). Some operations performed by the content recommendations engine 144 may be described with reference to FIG. 3.

Figure 3:
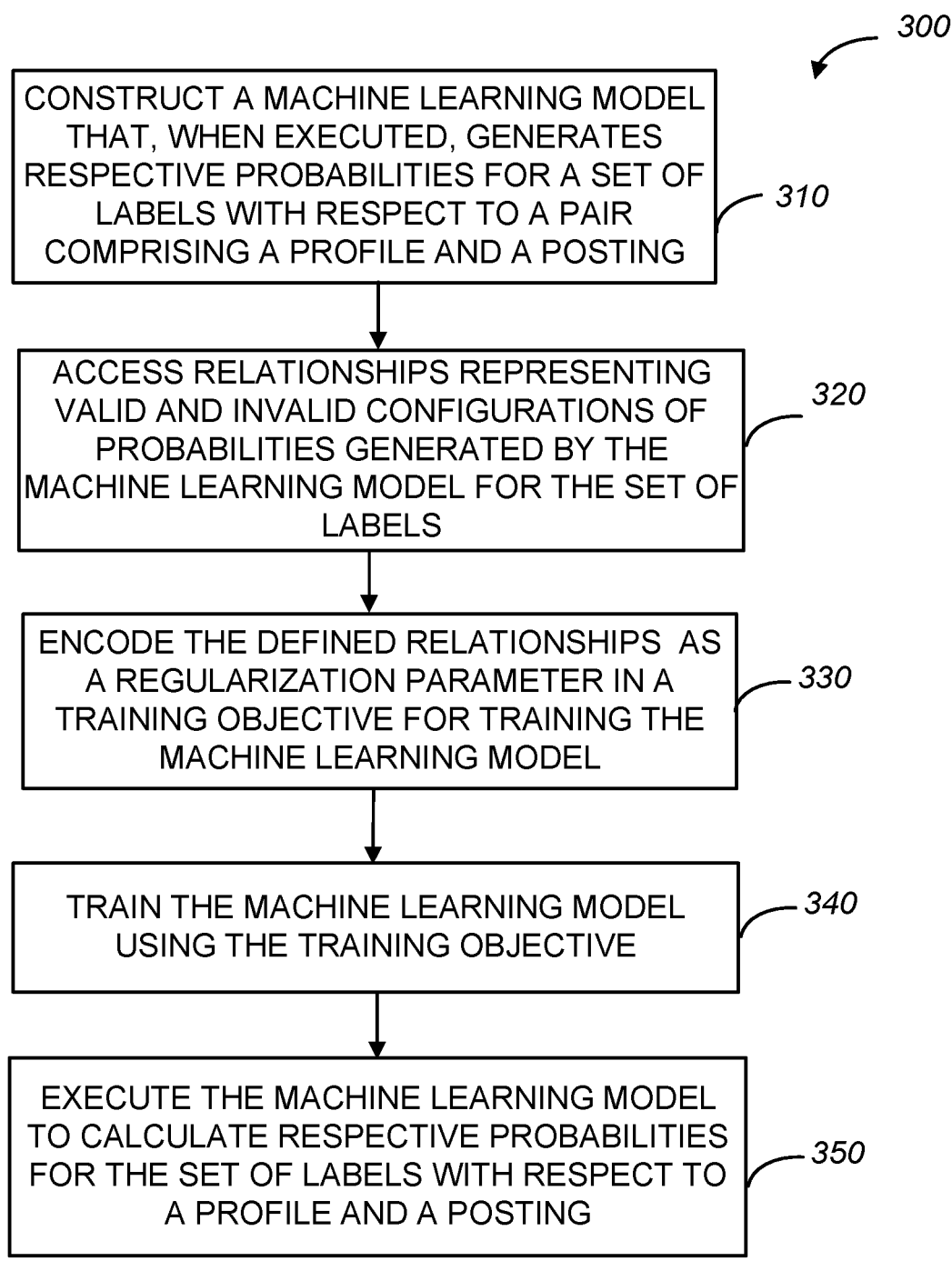
FIG. 3 is a flowchart illustrating multilabel learning with label relationships, in accordance with an example embodiment.

FIG. 3 is a flowchart of a method 300 for multilabel learning with label relationships posting in an online connection network 142 of FIG. 1. The method 300 may be performed by processing logic that may comprise hardware (e.g., dedicated logic, programmable logic, microcode, etc.), software, or a combination of both. In one example embodiment, the processing logic resides at the server system 140 of FIG. 1.

As shown in FIG. 3, the method 300 commences at operation 310, with constructing a machine learning model that, when executed, generates respective probabilities for a set of labels with respect to a pair comprising a member profile and a job posting. The constructing is performed in a computer system and may be based on input received from a user via a computer-generated user interface. The training data may be in the form of sets of data items, each set comprising a member profile, a job posting and a label representing action performed by a member represented by the member profile with respect to the job posting. The labels in the set of labels represent respective engagement events initiated by a member represented by the profile with respect to the posting, such as view, apply, save, and dismiss.

Operation 320 is accessing electronically stored relationships among labels, the relationships comprising a valid configuration and an invalid configuration of probabilities generated by the machine learning model for labels in the set of labels. The relationships among labels are defined in the computer system by executing one or more computer instructions provided in the computing environment with respect to one or more relationship parameters. The relationship parameters may be provided to the computer system by a user via a computer-generated user interface.

Examples of valid and invalid configurations with respect to hierarchical and exclusion relationships among the labels are described above, with reference to Table 1, Table 2, Expression 1, Expression 2, Expression 3 and Expression 4. At operation 330, the relationships among the labels are encoded as a regularization parameter in one of the training objectives for training the machine learning model, where invalid configurations result in penalty. The encoding of the relationships among the labels as a regularization parameter in one of the training objectives for training the machine learning model is performed by executing one or more computer instructions. For example, a machine learning tool in the form of an API (application programming interface) may be configured to determine whether a set of labels representing possible prediction outcomes with respect to input to the machine learning model is characterized by a relationship (e.g., hierarchical or exclusion relationship) and, in response to a positive determination, initialize an associated training objective using electronically stored relationship parameters representing the relationship. As explained above, relationship parameters may be provided to the computer system by a user via a computer-generated user interface or, in some embodiments, the relationship parameters may be generated in the computer system by automatically analyzing electronically stored training data. The machine learning model is trained in the computer system, using the training objective that encodes relationships among labels as a regularization parameter, at operation 340. The training of a machine learning model, achieved by executing a training module that takes, as input, electronically stored training data and one or more encoded training objectives, results in learned attributes that define the machine learning models, e.g., regression coefficients, decision tree split locations, etc.

At operation 350, the trained machine learning model is executed to calculate respective probabilities for the set of labels with respect to a pair comprising a given profile and a given job posting. Based on the calculated probabilities, the job posting is selected for presentation on a display device of a user represented by the given profile. In some embodiments, where the online connection network system 142 of FIG. 1 generates a news feed user interface for a user represented by a member profile in the online connection network system 142, the content recommendation engine 144 of FIG. 1 generates, based on the calculated probabilities an event indicating that a reference to the job posting is to be inserted in the news feed user interface. When a news feed user interface indicating a reference to a job posting is displayed on a display device of a user, the user can click on the reference to view the associated job posting. The news feed user interface may also be generated to include, next to a reference to a job posting, one or more visual controls that a user can engage, in order to effectuate other actions with respect to the associated job posting. Such one or more visual controls may include, e.g., a visual control for saving the associated job posting, a visual control for applying for a job represented by the associated job posting and a visual control for dismissing the associated job posting. Respective probabilities generated for different labels may be used in different computer-implemented products. For example, probability of an event represented by the view label with respect to a job posting may be used in determining whether to present a reference to the job posting on a web page generated for the user of the online connection network (e.g., on a news feed web page, as described above). Probability of an event represented by the apply label with respect to a job posting may be used in determining whether to email information associated with the job posting to the user.

Figure 4:
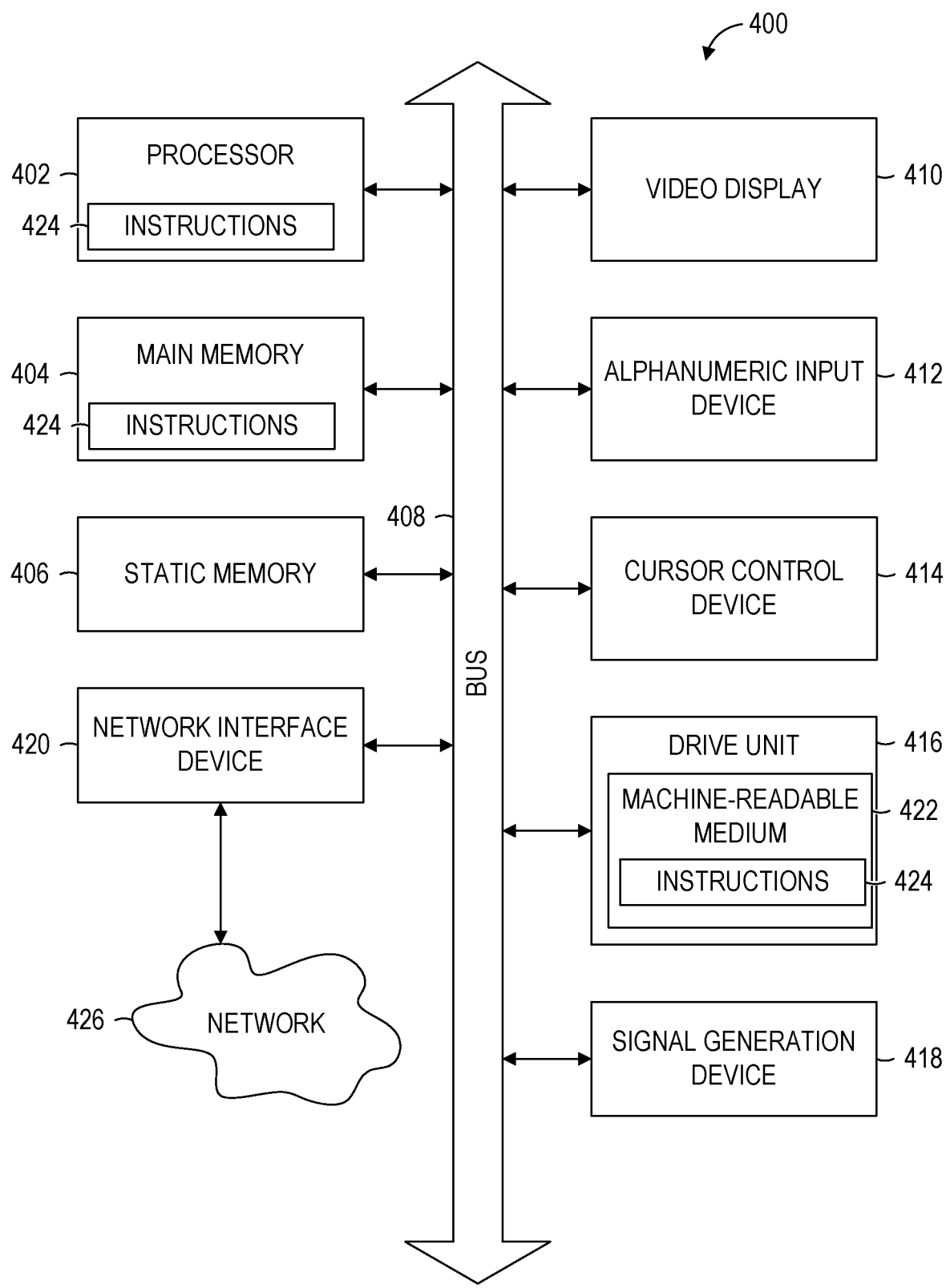
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible thing, be that a thing that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system for machine learning based method for multilabel learning with label relationships in online connection networks has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
   in an online connection network system, maintaining a plurality of member profiles and a plurality of job postings;
   constructing a machine learning model and initially training the machine learning model to take as an input (1) a first vector representing a member profile from the plurality of member profiles, and (2) a second vector representing a job posting from the plurality of job postings, and to generate, as an output, respective probabilities for a set of labels representing respective engagement events initiated by a member, represented by the member profile, with respect to the job posting, wherein the training uses training data generated based on previously tracked engagement events in the online connection network system with respect to a plurality of pairs comprising a training member profile from the plurality of member profiles and a representative job posting from the plurality of job postings, wherein the engagement events for which the respective probabilities are generated, comprising one or more of: viewing the job posting, applying to a job described by the job posting, saving the job posting, or dismissing the job posting;

accessing electronically stored relationships between the set of labels defining how each label is either a subset relation, an exclusion relation, or an overlap relation with other labels comprising a number of probabilities for valid configurations of relationships between the engagement events, representing a positive probability output from the machine learning model, and a number of probabilities for invalid configurations of relationships between the engagement events, representing a zero probability output from the machine learning model;

encoding, by executing one or more computer instructions, the relationships as a regularization parameter in a training objective for retraining the machine learning model, where the training objective is minimizing a penalty, the penalty being directly related to the number of probabilities for invalid configurations predicted by the machine learning model; and retraining the machine learning model to minimize the number of probabilities for invalid configurations using the training data and the training objective by executing a training process in a computer system.

2. The method of claim 1, wherein:

an invalid configuration in the relationships comprises probability for a first label from the set of labels being greater than probability for a second label from the set of labels; and a valid configuration in the relationships comprises probability for the second label being greater than probability for the first label.

3. The method of claim 2, wherein:

probability for the second label is probability of a click action with respect to a reference to the job posting presented on a display device of a user; and probability for the first label is probability of an action subsequent to the click action with respect to the reference to the job posting.

4. The method of claim 3, wherein the click action causes display of the job posting on the display device.

5. The method of claim 1, wherein an invalid configuration in the relationships comprises probability for a first label from the set of labels being greater than probability for a second label from the set of labels or greater than probability for a third label from the set of labels.

6. The method of claim 5, wherein probability for the first label is probability of a dismiss action with respect to a reference to the job posting presented on a display device of a user.

7. The method of claim 6, wherein the dismiss action precludes a further action with respect to the reference to the job posting.

8. The method of claim 1, comprising:

executing the machine learning model to calculate respective probabilities for the set of labels with respect to a pair comprising a given member profile from the plurality of member profiles and a given job posting from the plurality of job postings; and based on the calculated respective probabilities, selecting the job posting for presentation on a display device of a member represented by the given profile in the online connection network system.

9. The method of claim 1, wherein the machine learning model is Deep Neural Networks.

10. A system comprising:

one or more processors; and a non-transitory computer readable storage medium comprising instructions that when executed by the one or processors cause the one or more processors to perform operations comprising:

in an online connection network system, maintaining a plurality of member profiles and a plurality of job postings;

constructing a machine learning model and initially training the machine learning model to takes as an input (1) a first vector representing a member profile from the plurality of member profiles, and (2) a second vector representing a job posting from the plurality of job postings, and to generate as an output respective probabilities for a set of labels representing respective engagement events initiated by a member represented by the member profile, with respect to the posting, wherein the training uses training data generated based on previously tracked engagement events in the online connection network system with respect to a plurality of pairs comprising a training member profile from the plurality of member profiles and a representative job posting from the plurality of job postings, wherein the engagement events for which the respective probabilities are generated, comprising one or more of: viewing the job posting, applying to a job described by the job posting, saving the job posting, or dismissing the job posting;

accessing electronically stored relationships between the set of labels defining how each label is either a subset relation, an exclusion relation, or an overlap relation with other labels comprising a number of probabilities for valid configurations of relationships between the engagement events, representing a positive probability output from the machine learning model, and a number of probabilities for invalid configurations of probabilities of relationships between the engagement events, representing a zero probability output from the machine learning model;

encoding, by executing one or more computer instructions, the relationships as a regularization parameter in a training objective for retraining the machine learning model, wherein, and wherein the training objective is minimizing a penalty, the penalty being directly related to the number of invalid configurations predicted by the machine learning model; and retraining the machine learning model using training data to minimize the number of invalid configurations and the training objective by executing a training process in a computer system.

11. The system of claim 10, wherein:

an invalid configuration in the relationships comprises probability for a first label from the set of labels being greater than probability for a second label from the set of labels; and a valid configuration in the relationships comprises probability for the second label being greater than probability for the first label.

12. The system of claim 11, wherein:
- probability for the second label is probability of a click action with respect to a reference to the job posting presented on a display device of a user; and
- probability for the first label is probability of an action subsequent to the click action with respect to the reference to the job posting.

13. The system of claim 12, wherein the click action causes display of the job posting on the display device.

14. The system of claim 10, wherein an invalid configuration in the relationships comprises probability for a first label from the set of labels being greater than probability for a second label from the set of labels or greater than probability for a third label from the set of labels.

15. The system of claim 14, wherein probability for the first label is probability of a dismiss action with respect to a reference to the job posting presented on a display device of a user.

16. The system of claim 15, wherein the dismiss action precludes a further action with respect to the reference to the job posting.

17. The system of claim 10, wherein the non-transitory computer readable storage medium comprises further instructions that when executed by the one or processors cause the one or more processors to perform operations comprising:
- executing the machine learning model to calculate respective probabilities for the set of labels with respect to a pair comprising a given member profile from the plurality of member profiles and a given job posting from the plurality of job postings; and
- based on the calculated respective probabilities, selecting the job posting for presentation on a display device of a member represented by the given member profile in the online connection network system.

18. A machine-readable non-transitory storage medium having instruction data executable by a machine to cause the machine to perform operations comprising:
- in an online connection network system, maintaining a plurality of member profiles and a plurality of job postings;
- constructing a machine learning model and initially training the machine learning model to takes as an input (1) a first vector representing a member profile from the plurality of member profiles, and (2) a second vector representing a job posting from the plurality of job postings, and to generate as an output respective probabilities for a set of labels representing respective engagement events initiated by a member represented by the member profile with respect to the job posting, wherein the training uses training data generated based on previously tracked engagement events in the online connection network system with respect to a plurality of pairs comprising a training member profile from the plurality of member profiles and a representative job posting from the plurality of job postings, wherein the engagement events for which the respective probabilities are generated, comprising one or more of: viewing the job posting, applying to a job described by the job posting, saving the job posting, or dismissing the job posting;
- accessing electronically stored relationships between the set of labels defining how each label is either a subset relation, an exclusion relation, or an overlap relation with other labels comprising a number of probabilities for valid configuration of relationships between the engagement events, representing a positive probability output from the machine learning model, and a number of probabilities for invalid configuration of probabilities of relationships between the engagement events, representing a zero probability output from the machine learning model;
- encoding, by executing one or more computer instructions, the relationships as a regularization parameter in a training objective for retraining the machine learning model, where the training objective is minimizing a penalty, the penalty being directly related to the number of probabilities for invalid configurations predicted by the machine learning model; and
- retraining the machine learning model using training data and the training objective by executing a training process in a computer system.

* * * * *